United States Patent [19]

Schwede et al.

[11] 4,029,367

[45] June 14, 1977

[54] BEARING SUPPORTING A SWASHPLATE OF A HYDRAULIC AXIAL CYLINDER MACHINE

[75] Inventors: Franz-Josef Schwede; Ingo Valentin, both of Ulm, (Danube), Germany

[73] Assignee: Hydromatic GmbH, Germany

[22] Filed: Apr. 21, 1976

[21] Appl. No.: 679,052

[30] Foreign Application Priority Data

May 13, 1975 Germany .................. 2521312

[52] U.S. Cl. .............................. 308/2 R; 308/6 R; 308/73; 308/217
[51] Int. Cl.[2] .................................. F16C 7/00
[58] Field of Search ............... 308/2 R, 2 A, 6 R, 73

[56] References Cited
UNITED STATES PATENTS

| 3,436,133 | 4/1969 | Newell | 308/166 |
|---|---|---|---|
| 3,521,532 | 7/1970 | Espig et al. | 308/73 |
| 3,984,159 | 10/1971 | Jenness | 308/73 |

*Primary Examiner*—Joseph F. Peters, Jr.
*Assistant Examiner*—Richard A. Bertsch

*Attorney, Agent, or Firm*—Owen, Wickersham & Erickson

[57] ABSTRACT

A sliding swivel link is kinematically connected to an arcuate bearing cage in a hydraulic axial cylinder machine (of the kind having a concave cylindrical bearing face in the machine casing, a corresponding convex cylindrical bearing face on the swashplate, and an arcuate bearing cage with rolling contact bearing elements contained within the cage and disposed in the space between the concave and convex bearing cases) for positively displacing the bearing cage to a theoretically correct position on each change of tilt of the swashplate.

The sliding swivel link includes a flexurally elastic rod which is pivotally connected at one end to the swashplate and which is pivotally connected at its other end to the casing. The rod is longitudinally slidable within the pivotal connection to the swashplate and is also linked to the bearing cage so that the bearing cage is always urged into a position on the line connecting the two pivotal connections at the opposite ends of the rod.

6 Claims, 3 Drawing Figures

U.S. Patent   June 14, 1977   4,029,367
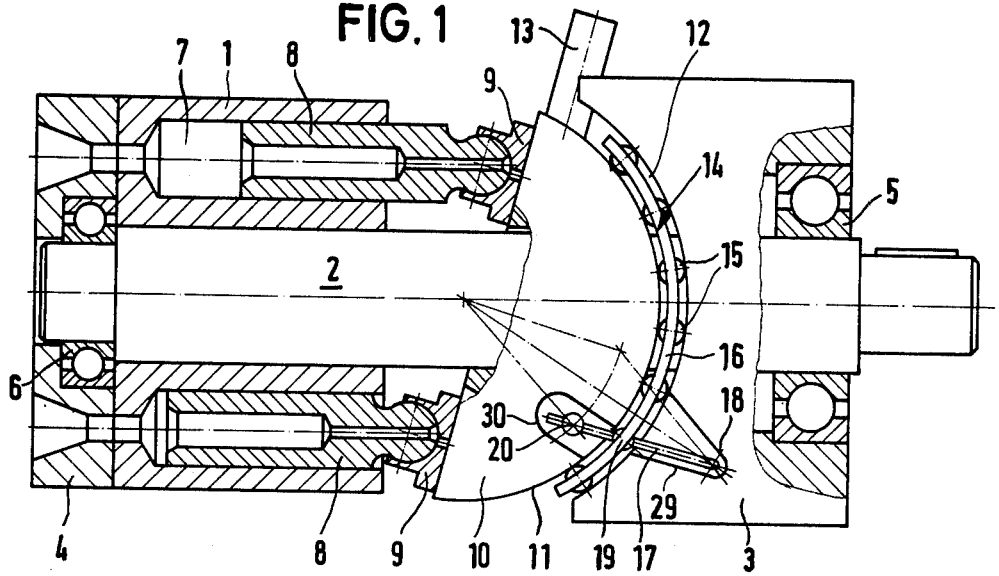
FIG. 1
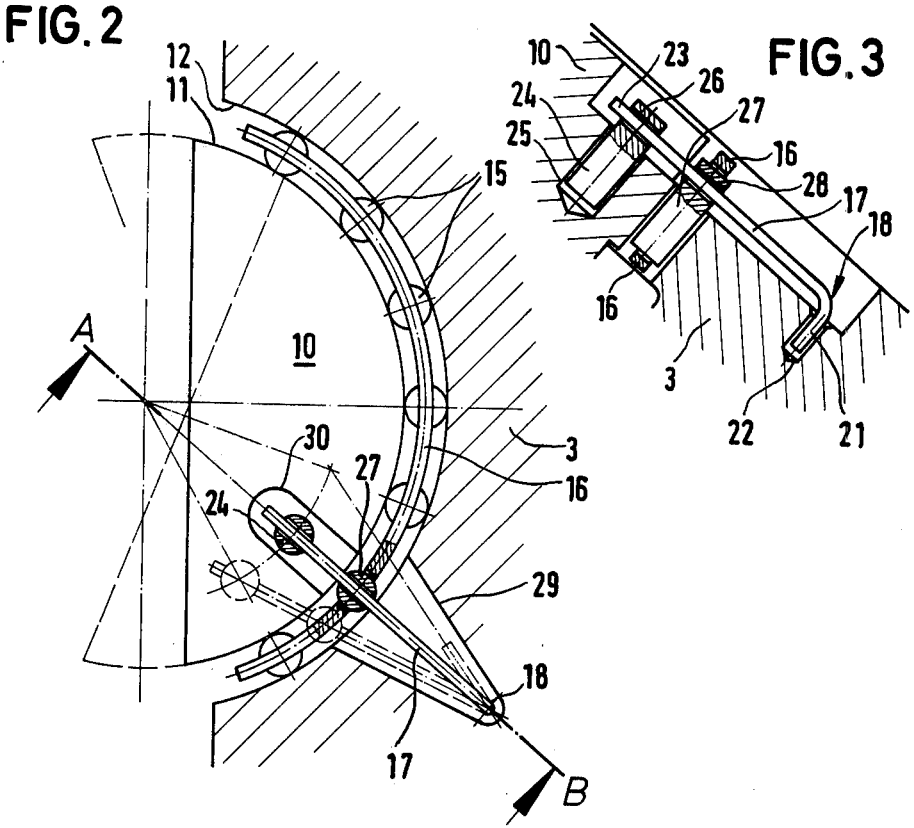
FIG. 2
FIG. 3

BEARING SUPPORTING A SWASHPLATE OF A HYDRAULIC AXIAL CYLINDER MACHINE

BACKGROUND OF THE INVENTION

The invention relates to a bearing supporting the tiltable swashplate of a hydraulic axial cylinder machine, comprising segments of rolling contact bearing elements held in arcuate cages between a concave cylindrical bearing face in the machine casing and a corresponding convex cylindrical bearing face on the swashplate.

When the swashplate is readjusted for the purpose of changing the stroke of the axial cylinder machine the segments containing the rolling contact bearing element, generally rollers, travel between the two cylindrical bearing surfaces half as far as the surface of the swashplate itself. This theoretical relationship holds only if the rolling contact elements, i.e. the rollers, actually perform an exclusively rolling motion. In practive it is impossible to prevent the cage from slipping in course of time after repeated adjustment and/or as a result of vibrations. The result is that the rolling contact elements will move into a less favorable position for supporting the load.

A problem which consequently present itself is that of keeping the bearing segments between the cylindrical surface of the swashplate and the corresponding concave cylindrical surface in the casing in the best position for supporting the load, i.e. so that in actual practice they will, in fact, travel exactly half the distance the swashplate bearing surface moves during adjustment.

For the purpose of positively driving the bearing segments so that they will respond to movements of the swashplate and be entrained the required distance, and for ensuring correct rolling contact and the desired distribution of the load, it has already been proposed in the published specification of German Pat. application No. 1,653,617 to provide the bearing segments, i.e. their cages, with pinions which engage a gear segment affixed to the casing as well as a gear segment yieldingly attached to the swashplate. However, this is a complex and expensive design that requires a large number of individual components. The pinions engaging the gear segments cause considerable wear and close tolerances are needed in manufacture, apart from the fact that the accommodation of this arrangement requires a considerable amount of extra space.

SUMMARY OF THE INVENTION

It is an important object of the present invention to provide a simple follow-up guidance system for the bearing segments in rolling contact bearings for swashplates of the contemplated kind.

According to the invention, a sliding swivel link kinematically couples each cage with a flexurally elastic rod which extends in a roughly radial direction of the swashplate. One end of the rod swivels about a fulcrum in the casing whereas the other end of the rod longitudinally slidably swivels about a fulcrum in the swashplate. Alternatively, one end of the flexurally elastic rod can swivel about a fixed fulcrum in the swashplate and the other end of the rod can swivel longitudinally slidably about a fulcrum in the casing.

In this simple mechanism the flexurally elastic rod swivels about its fixed fulcrum whenever the swashplate is tilted, and it therefore positively displaces the cage of the associated bearing segment into the theoretically correct position. For example, assuming friction tends to prevent the bearing segment from moving the correct distance, then the reactive thrust of the flexurally elastic rod acting on the cage will nevertheless force the segment to move as required. The flexural elasticity of the rod ensures that the point where the rod is linked to the cage will always be urged into a position on the line connecting the two fulcra of the rod in the casing and in the swashplate.

By suitably choosing the lengths of the arms of the elastic rod between its fulcrum in the casing and its fulcrum on the cage on the one hand, and its fulcrum in the swashplate and its fulcrum on the cage on the other hand, the distance of travel of the bearing segment for any angle of deflection of the swashplate can always be accurately present within a sufficiently wide range of angles of the swashplate. Since in axial cylinder machines to which the present invention is applied the maximum angle of tilt of the swashplate does not exceed 30°, entrainment of the bearing segment (so that it travels half as far as the swashplate bearing surface) is assured with a satisfactory degree of geometrical accuracy.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a diagrammatic section of an axial cylinder machine equipped with follow-up mechanism according to the invention, FIG. 2 is a diagrammaic section of the swashplate bearings on a larger scale, and FIG. 3 is a fragmentary section taken on the line A—A in FIG. 2.

DETAILED DESCRIPTION OF THE PREFERRED EMBODIMENTS

Referring to FIG. 1, a variable stroke axial cylinder machine comprises a cylinder block 1 mounted on a shaft 2, the shaft being a drive shaft or an output shaft according to whether the machine is to function as a pump or a motor.

The shaft 2 runs in bearings 5 and 6 in the casing of the machine represented only by two portions 3 and 4.

The cylinder block 1 contains bores 7 forming cylinders for pistons 8 which engage socket members 9 on a swashplate 10.

The swashplate 10 has a convex cylindrical bearing surface 11 facing a corresponding concave cylindrical surface 12 in part 3 of the casing.

The stroke of the pistons 8 in their cylinder bores 7 can be varied, as is well understood, by adjusting the angle of tilt of the swashplate 10 in relation to the axis of shaft 2. Adjustment can be effected for instance by a lever arm 13 which is affixed to the swashplate 10 and deflectable by adjusting means not shown in the drawing.

The gap between the two bearing surfaces 11 and 12 contains a segment of a rolling contact bearing 14 comprising rollers 15 held in prescribed positions by a cage 16.

The follow-up mechanism according to the invention consists of a flexurally elastic rod which swivels about a fulcrum 18 in part 3 of the casing besides being axially slidably linked to a swivel bearing 20 in the swashplate 10.

As illustrated in FIGS. 2 and 3 that fulcrum 18 in part 3 of the casing may be simply formed by the perpendicularly off-angled end 21 of the rod 17 engaging a hole 22 in part 3 of the casing.

The bearing in the swashplate 10 for the other end 23 of the rod 17 consists of a swivel pin 24 which is rotatably mounted in a bore 25 in the swashplate 10 and contains a transverse hole 26 through which the end 23 of the rod 17 slidably passes.

The bearing 19 consists of a cylindrical pin 17 which likewise contains a transverse hole 28 through which the rod 17 slidably passes.

In the interests of a compact design, part 3 of the casing 3 contains a recess 29 (see FIG. 2) for accomodating the rod 17, and a further recess 30 (see FIG. 2) in the swashplate 10 permits the rod 17 to perform the required swivel motions without being impeded. The distances between the swivel bearings 19, 20 and 19, 18 can be readily chosen so that the swivel bearing 19 together with the cage 16 will be displaced a distance equal to half the distance travelled by a point on the surface 11 of the swashplate 10. This geometrical requirement is satisfied with sufficient accuracy for all angles of tilt of the swashplate 10 that are needed in axial cylinder machines of the kind described.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a hydraulic axial cylinder machine of the kind having a concave cylindrical bearing face in the machine casing, a corresponding convex cylindrical bearing face on the swashplate, and an arcuate bearing cage with rolling contact bearing elements contained within the cage and disposed in the space between said concave and convex bearing faces, the improvement comprising, follow-up guide means for positively displacing the bearing cage to a theoretically correct position on each change of tilt of the swashplate, said guide means comprising a rod, a first pivotal connection between the rod and the swashplate, a second pivotal connection between the rod and the casing, and wherein the rod is linked to the bearing cage so that the bearing cage is always urged into a position on the line connecting the first and second pivotal connections.

2. The invention defined in claim 1 wherein the rod is a flexurally elastic rod and is longitudinally slidable within the first pivotal connection.

3. The invention defined in claim 2 wherein the second pivotal connection comprises a hole in the casing and the related end of the rod is perpendicularly off-angled to engage the hole in the casing to thereby form a bearing.

4. The invention defined in claim 2 wherein the first pivotal connection includes a pivot pin rotatably mounted in the swashplate and the related end portion of the flexurally elastic rod slidably passes through a transverse hole in the pin.

5. The invention defined in claim 2 wherein the link between the rod and the bearing cage comprsies a pivot pin which is rotatable about an axis parallel to the axes of the rolling contact bearing elements and wherein the rod slidably passes through a transverse hole in said pivot pin.

6. The invention defined in claim 5 wherein the distance between the first pivotal connection and the link between the rod and the bearing cage is half as long as the distance between the second pivotal connection and the link between the rod and the bearing cage.

* * * * *

UNITED STATES PATENT AND TRADEMARK OFFICE
CERTIFICATE OF CORRECTION

PATENT NO. : 4,029,367
DATED : June 14, 1977
INVENTOR(S) : FRANZ-JOSEF SCHWEDE; INGO VALENTIN It is certified that error appears in the above-identified patent and that said Letters Patent are hereby corrected as shown below:

Column 3, line 8, after "bearing" insert --in the cage 16 at 19 and to a further swivel bearing--.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*